UNITED STATES PATENT OFFICE.

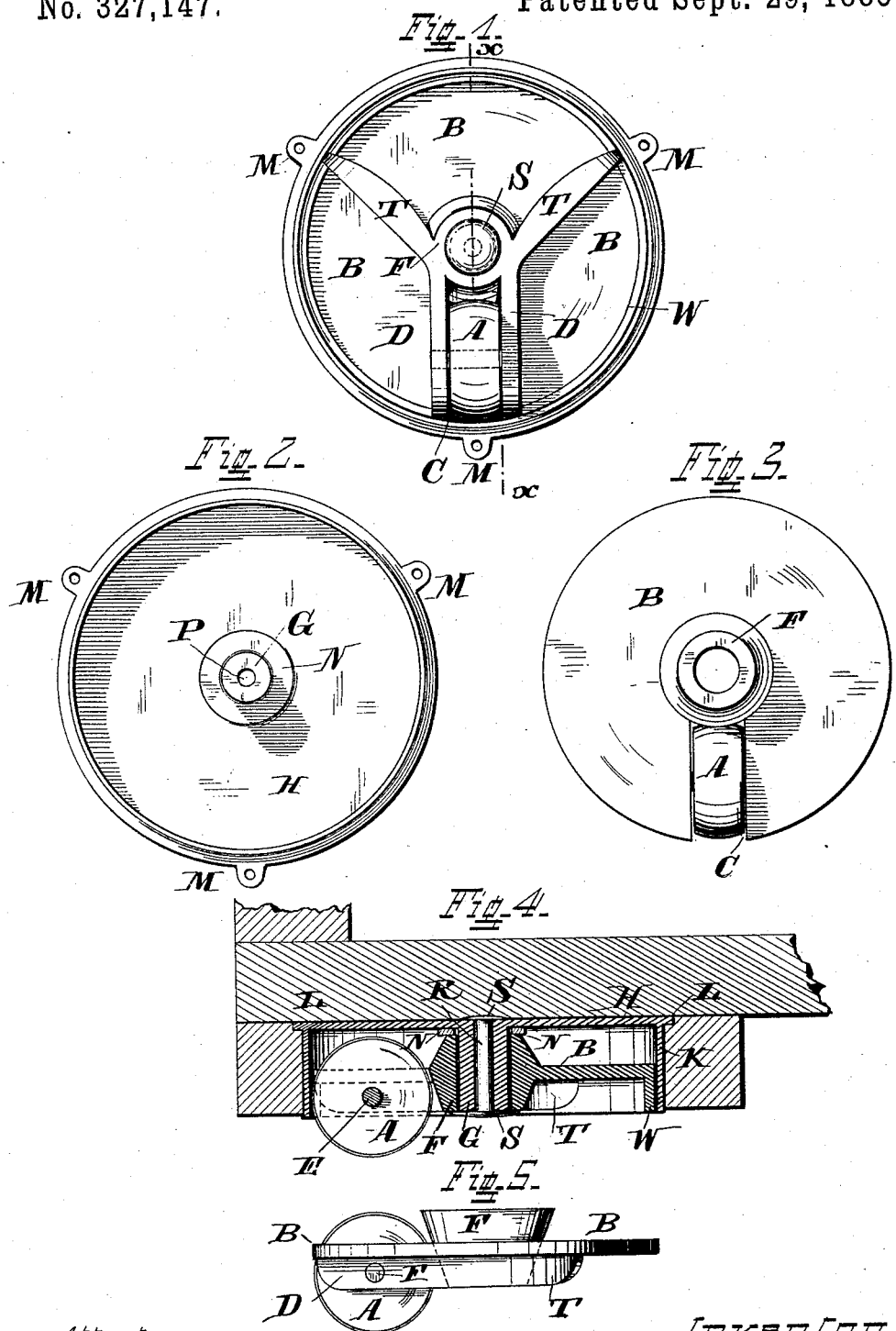

NATHAN DRUCKER, OF CINCINNATI, OHIO.

CASTER.

SPECIFICATION forming part of Letters Patent No. 327,147, dated September 29, 1885.

Application filed December 29, 1884. (No model.)

*To all whom it may concern:*

Be it known that I, NATHAN DRUCKER, a resident of the city of Cincinnati, in Hamilton county, and State of Ohio, have invented certain new and useful Improvements in Casters, of which the following is a specification.

My improvements are designed to be used in casters for trunks, furniture, and other articles requiring casters.

The several features of my invention and the various advantages resulting from their use conjointly or otherwise will be fully hereinafter set forth.

In the accompanying drawings, Figure 1 is a view of the bottom of a caster embodying my invention. Fig. 2 is a view of the caster-box, the caster-wheel and the accompanying parts which rotate with said wheel being removed, the view being taken from below and looking up into the caster-box. Fig. 3 is a view of the caster-wheel and of the upper side or top of the plate and hub which rotate with the wheel, the side shown in the view being the reverse of that shown in Fig. 1. Fig. 4 represents a vertical section of the caster, the section being taken at the dotted line X X of Fig. 1, the view being substantially central, except that the central bolt or pin and the wheel is shown in elevation. The caster is here shown applied to a trunk, the caster being embedded or sunk in a trunk-strip, the latter being shown in cross-section. Fig. 5 is a side elevation of the caster wheel and hub, and arms and braces, and showing a modified form of a part of the hub.

A indicates the caster-wheel.

B indicates the plate which turns with said wheel. This plate B is provided with a slot, C, and with arms or ridges D, one of these arms or ridges being at one side of the slot, and the other of these arms or ridges being at the other side of the said slot. In the slot C is the wheel A, the axial support E of the wheel being connected to the arms D. This axial support preferably consists of a pin or pivot riveted or otherwise rigidly fixed in and to the arms D, one end of said pivot being fixed in one of said arms, and the other end of said pivot being fixed in the other of said arms, the wheel turning loosely on the pivot. These arms are preferably located on the lower or under side of the plate B.

The lower portion of the periphery of wheel A is below the plate B and the arms D. The plate B is centrally provided with a hub, F, rigidly fixed to the plate. This hub F in turn rotates on an axial bearing or arbor, G, and by suitable means is secured in place on the said arbor. This arbor is suitably supported and held in place, the preferred means for this purpose consisting, as shown, of the plate H, to which the arbor is rigidly secured. In the event of the caster being used for trunks and similar articles, the plate B and the upper part of the wheel A of the hub F, bearing G, and plate H will usually be in a recess in the trunk-strip. In such an event it is desirable to line this recess with a metallic casing, K, fixed to plate H. The casing K will then, in connection with plate H, form a box in which the wheel A, and the plate B, and hub, &c., may rotate.

The box may be secured either at its top or bottom to the trunk-strip. If secured at the top, the periphery of the plate H may be provided with an outlying flange, L, as shown in Fig. 4, or with ears or lugs M, (see Figs. 1 and 2,) through which securing screws or bolts may be passed into the wood.

The top of the hub may rest directly upon the flat plate H; but preferably, as shown, rests and turns an intervening disk or portion, N, (see Figs. 2 and 4,) and the latter may be integral with plate H, but preferably consists of a metallic washer.

The mode of keeping the hub F in place on arbor G consists in providing the latter with a central recess or perforation, P, and introducing into this recess or perforation a screw or bolt or rivet, R. The latter, being the preferred connection on account of economy, simplicity, and facility of adjustment, is shown, and is provided with heads S S.

The plate B is connected to the hub at the middle of the vertical length of the latter or substantially thereat. This feature of construction affords several advantages, among which are the following: The blow, impact, strain, or pressure which is communicated to the caster-wheel when in use is communicated to the plate B, and in consequence of the plate being connected to the hub at its mid-height the strain on the hub is equal both above and below the plate B, and the strain is communicated equally to the arbor at all points. The plate B is less likely to be broken from the hub, and the hub revolves with more ease and facility around the arbor, and without tendency to bind even when the caster is subjected to great superincumbent pressure or to a sudden and violent impact. The axial strains are thus equalized.

For further strengthening the hub I form it so that its diameter at its junction with the plate B shall be greater than at the bottom of the hub, thereby affording greater thickness of metal and increased resistance to breakage at said junction of said plate B and said hub. In such case the preferred form for the hub is that of a double truncated cone, (see Fig. 4;) but the conical form shown in Fig. 5 may be employed, particularly when a very wide bearing is needed. The perfection of the balance or equilibrium of the plate B may be increased by forming the ridges T T on the plate B. These ridges T T preferably extend radially, as shown, from the hub, and are preferably located, as shown, so that the arms D, counted as one, and the ridges T T shall divide the surface of the plate into three parts substantially equal. These ridges T T are usually to be made quite heavy, as shown, and thus operate to counterbalance the caster-wheel and the arms D, and, in conjunction with the arrangement of the plate B at the mid-height of the hub, enables plate B to rotate more easily. Furthermore, said ridges, as well as the hub enlarged at center, as described, impart great strength and firmness to the plate B, and diminish its liability to fracture or bend, and aid in preventing its deflecting to such an extent as would cause the hub to bind by bearing unequally on the arbor or on portion N. The ridges T T are preferably placed on the under side of plate B. These ridges T T and the arms D are preferably united to the hub, and also together in the vicinity of the hub. The plate B, the arms D, ridges T T, and hub F are preferably cast or wrought in one piece. The plate H and the casing K are also preferably cast or wrought in one piece.

The portion N affords a safe, sure, and easy bearing for the upper end of the hub, and when portion N is a washer it can, in case it wears, be readily removed and a new washer be quickly substituted therefor.

Where great strength is needed in the caster, the plate B may be further provided, as shown in Figs. 1 and 4, with the flange W. This flange W is connected to plate B at or near the periphery of the latter, and extends downwardly. This flange stiffens and greatly strengthens the plate B, and where it is rigidly connected to the arms, as will usually be the case, will give them additional stiffness. Thus the plate B, the hub, the arms, ridges, and flange W, cast or wrought in one piece, combine to form as an entirety a very strong and durable rotatable bearing and support for the caster-wheel.

While the several features of my invention are preferably employed together, one or more of said features may be employed without the remainder, and in so far as applicable one or more of said features may be employed in connection with casters other than the one particularly hereinbefore described.

What I claim as new and of my invention, and desire to secure by Letters Patent, is—

1. A caster having a central bearing or arbor, and a hub, and a discal plate, B, rigidly connected to the hub at the mid-height of the latter, and caster-wheel whose pivots or supports are connected to the plate, substantially as and for the purposes specified.

2. In a caster, a discal plate connected to a hub concentric therewith, and provided with arms D D and radial ridges T T, substantially as and for the purposes specified.

3. In a caster, a fixed arbor, a discal plate connected to a hub concentric therewith, and arms D D, ridges T T, and annular flange W, the said arms, ridges, and flanges connected to the hub and caster-wheel, substantially as and for the purposes specified.

4. The combination of plate H, fixed bearing G, hub, discal plate, wheel, and bearing portion N, substantially as and for the purposes specified.

5. The combination of the caster-box, hub F, plate B, located at the mid-height of said hub, arms D D, and wheel A, substantially as and for the purposes specified.

6. The combination of the caster-box, hub, plate B, arms D D, wheel A, and flange W, substantially as and for the purposes specified.

7. The combination of the fixed arbor G, supporting stationary caster-frame, hub, plate B fixed to said hub at its mid-height, and bolt R, provided with heads or ends S S, substantially as and for the purposes specified.

NATHAN DRUCKER.

Attest:
WM. E. JONES,
JNO. W. STREHLI.